United States Patent
Komatsu et al.

(10) Patent No.: US 10,370,056 B2
(45) Date of Patent: Aug. 6, 2019

(54) BICYCLE OPERATION DEVICE

(71) Applicant: Shimano Inc., Sakai, Osaka (JP)

(72) Inventors: Atsushi Komatsu, Osaka (JP);
Takehiko Nakajima, Osaka (JP);
Takafumi Nishino, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/686,957

(22) Filed: Aug. 25, 2017

(65) Prior Publication Data

US 2018/0086412 A1 Mar. 29, 2018

(30) Foreign Application Priority Data

Sep. 29, 2016 (JP) .................................. 2016/191957

(51) Int. Cl.
| | |
|---|---|
| *B62K 23/06* | (2006.01) |
| *H04W 76/10* | (2018.01) |
| *B60T 7/10* | (2006.01) |
| *B62K 21/12* | (2006.01) |
| *B62M 25/08* | (2006.01) |
| *G05G 11/00* | (2006.01) |

(52) U.S. Cl.
CPC ............... *B62K 23/06* (2013.01); *B60T 7/10* (2013.01); *B62K 21/12* (2013.01); *B62M 25/08* (2013.01); *H04W 76/10* (2018.02); *G05G 11/00* (2013.01)

(58) Field of Classification Search
CPC ........... B62K 23/02; B62K 23/06; B60T 7/10; B62M 25/08; G05G 11/00; G05G 1/04; G05G 13/00
See application file for complete search history.

(56) References Cited

U.S. PATENT DOCUMENTS

| | | | |
|---|---|---|---|
| 8,909,424 B2 | 12/2014 | Jordan et al. | |
| 9,073,596 B2 | 7/2015 | McLaughlin et al. | |
| 2013/0221713 A1* | 8/2013 | Pelot | B62J 1/02 |
| | | | 297/215.13 |
| 2015/0000452 A1* | 1/2015 | Hirotomi | B62K 23/06 |
| | | | 74/488 |
| 2015/0000455 A1* | 1/2015 | Hirotomi | B62K 23/06 |
| | | | 74/491 |
| 2017/0050702 A1* | 2/2017 | Grassi | B62M 25/08 |
| 2018/0127058 A1* | 5/2018 | Rodgers | B62M 9/122 |
| 2018/0257736 A1* | 9/2018 | Komatsu | B62K 23/02 |
| 2018/0257737 A1* | 9/2018 | Komatsu | B62K 25/08 |

FOREIGN PATENT DOCUMENTS

CN 101746466 A1 6/2010

* cited by examiner

*Primary Examiner* — David H Bollinger
(74) *Attorney, Agent, or Firm* — Global IP Counselors, LLP

(57) ABSTRACT

A bicycle operation device includes a clamp and an operation unit. The clamp is attachable to a handlebar of a bicycle. The operation unit includes a wireless communicator configured to communicate with a bicycle component and an electric switch configured to transmit a signal to the wireless communicator. The operation unit is attachable to the clamp in a manner allowing for adjustment of the position of the operation unit relative to the clamp.

27 Claims, 8 Drawing Sheets

BICYCLE OPERATION DEVICE

CROSS-REFERENCE TO RELATED APPLICATIONS

This application claims priority to Japanese Patent Application No. 2016-191957, filed on Sep. 29, 2016. The entire disclosure of Japanese Patent Application No. 2016-191957 is hereby incorporated herein by reference.

BACKGROUND

Field of the Invention

The present invention generally relates to a bicycle operation device.

Background Information

A bicycle operation device is known in the art that includes a wireless communication unit. One example of a bicycle operation device includes a clamp attached to a handlebar of a bicycle, an operation unit integrally coupled to the clamp, and a wireless communicator arranged in the operation unit. U.S. Pat. No. 890,942 (Patent Document 1) discloses one example of a known bicycle operation device.

SUMMARY OF THE INVENTION

It is preferred that the position of the operation unit relative to the handlebar be easy to adjust.

It is an object of the present invention to provide a bicycle operation device that allows for easy adjustment of the position of the operation unit relative to the handlebar.

In accordance with a first aspect of the invention, a bicycle operation device includes a clamp and an operation. The clamp is attachable to a handlebar of a bicycle. The operation unit includes a wireless communicator and an electric switch. The wireless communicator is configured to communicate with a bicycle component. The electric switch is configured to transmit a signal to the wireless communicator. The operation unit is adjustably attachable to the clamp in a manner allowing for adjustment of a position of the operation unit relative to the clamp. Thus, the position of the operation unit relative to the handlebar is easy to adjust.

In accordance with a second aspect of the invention, a bicycle operation device includes a coupling member, a clamp and an operation. The clamp is attachable to a handlebar of a bicycle. The operation unit includes a wireless communicator and an electric switch. The wireless communicator is configured to communicate with a bicycle component. The electric switch is configured to transmit a signal to the wireless communicator. The operation unit is attachable to the clamp by the coupling member. The clamp includes a first end and a second end. The first end includes a first insertion hole that receives the coupling member. The second end includes a second insertion hole that receives the coupling member. The coupling member is configured to adjust a distance between the first end and the second end=. The coupling member decreases the distance between the first end and the second end to attach the clamp to the handlebar. When the distance between the first end and the second end is long, the clamp can easily be moved relative to the handlebar. Thus, the position of the operation unit relative to the handlebar is easy to adjust.

In accordance with a third aspect of the invention, in the bicycle operation device according to the first aspect, the clamp includes a first end and a second end. The first end includes a first insertion hole that receives a coupling member. The second end includes a second insertion hole that receives the coupling member. The operation unit is attached to the clamp by the coupling member. Thus, the clamp and the operation unit are securely coupled to each other.

In accordance with a fourth aspect of the invention, in the bicycle operation device according to the second or third aspect, the operation unit includes a plurality of fastening holes. The coupling member is selectively fastened at the fastening holes to adjust of a position of the operation unit relative to the clamp. Thus, the structure for adjusting the position of the operation unit is simplified.

In accordance with a fifth aspect of the invention, in the bicycle operation device according to any one of the preceding aspects, the operation unit further includes a power supply that supplies power to the wireless communicator. Thus, the wiring related to the operation unit is simplified.

In accordance with a sixth aspect of the invention, in the bicycle operation device according to any one of the preceding aspects, the operation unit further includes a notification portion. This provides the user with information.

In accordance with a seventh aspect of the invention, the bicycle operation device according to any one of the preceding aspects further includes a position adjustment mechanism configured to adjust a position of the operation unit relative to the clamp in an axial direction of the clamp that is parallel to a center axis of the handlebar in a state in which the bicycle operation device is mounted to the handlebar. This allows for fine adjustment of the position of the operation unit.

In accordance with an eighth aspect of the invention, in the bicycle operation device according to the seventh aspect, the position adjustment mechanism includes a guide structure that guides the operation unit in the axial direction. The guide structure includes a recess and a projection that extend in the axial direction. The recess is arranged in one of the clamp and the operation unit. The projection is arranged on the other one of the clamp and the operation unit. Thus, the position of the operation unit can be adjusted in a continuous manner.

In accordance with a ninth aspect of the invention, in the bicycle operation device according to any one of the preceding aspects, the clamp is separate from a brake clamp that attaches a brake operation unit of the bicycle to the handlebar. Thus, the position of the operation unit relative to the handlebar can be adjusted separately from the brake clamp.

In accordance with a tenth aspect of the invention, in the bicycle operation device according to any one of the preceding aspects, the electric switch includes a first switch and a second switch. Thus, the user can operate the first switch and the second switch with the same hand.

In accordance with an eleventh aspect of the invention, in the bicycle operation device according to any one of the first to ninth aspects, the electric switch includes a first switch, a second switch, and a third switch. Thus, the user can operate the first to third switches with the same hand.

In accordance with a twelfth aspect of the invention, in the bicycle operation device according to any one of the first to ninth aspects, the electric switch includes only a first switch. Thus, the configuration of the operation unit is simplified.

In accordance with a thirteenth aspect of the invention, in the bicycle operation device according to the tenth aspect, the operation unit further includes a first operation member that operates the first switch and a second operation member that operates the second switch. Thus, the configuration of the first operation member is simplified.

In accordance with a fourteenth aspect of the invention, in the bicycle operation device according to the thirteenth aspect, the first operation member includes a first lever that is pivotal about a first axis, and the second operation member includes a second lever that is pivotal about a second axis. Thus, the first operation member and the second operation member are easy to operate.

In accordance with a fifteenth aspect of the invention, in the bicycle operation device according to the fourteenth aspect, the first lever is pivoted along a first movement plane that is orthogonal to the first axis. The second lever is pivoted along a second movement plane that is orthogonal to the second axis. An angle formed by the first movement plane and the second movement plane is 20° or greater and 70° or less. Thus, the first operation member and the second operation member are easy to operate.

In accordance with a sixteenth aspect of the invention, in the bicycle operation device according to the fourteenth or fifteenth aspect, the operation unit includes an operation position adjustment mechanism that is configured to adjust an initial position of at least one of the first operation member and the second operation member. Thus, the initial position of at least one of the first operation member and the second operation member can be easily adjusted.

In accordance with a seventeenth aspect of the invention, in the bicycle operation device according to any one of the thirteenth to sixteenth aspects, the first operation member is configured to be operated by a first finger of a user, and the second operation member is configured to be operated by a second finger of the user. Thus, the first operation member and the second operation member are easy to operate.

In accordance with an eighteenth aspect of the invention, in the bicycle operation device according to the fifth aspect, the operation unit further includes a housing and a power supply cover, the housing includes an accommodation portion configured to at least partially accommodate the power supply, the power supply cover at least partially covers an opening of the accommodation portion, and the power supply cover is attachable in a removable manner to the housing. This protects the power supply.

In accordance with a nineteenth aspect of the invention, in the bicycle operation device according to the eighteenth aspect, the power supply includes a battery and a battery holder, and the battery is attached in a removable manner to the battery holder. Thus, the battery is easy to replace.

In accordance with a twentieth aspect of the invention, in the bicycle operation device according to the first or second aspect, the operation unit further includes a housing that accommodates the wireless communicator and allows the transmission of radio waves output from the wireless communicator. Thus, the wireless communicator can perform communication in a satisfactory radio wave state.

In accordance with a twenty-first aspect of the invention, in the bicycle operation device according to the twentieth aspect, the housing includes a resin material. This reduces the weight of the operation unit.

In accordance with a twenty-second aspect of the invention, in the bicycle operation device according to the twentieth or twenty-first aspect, the housing includes a front housing portion, which is a front half of the housing, and a rear housing portion, which is a rear half of the housing. The wireless communicator is disposed in the rear housing portion. Thus, more space is provided in the front housing portion for the arrangement of other elements.

In accordance with a twenty-third aspect of the invention, in the bicycle operation device according to the twentieth or twenty-first aspect, the housing includes a front housing portion, which is a front half of the housing, and a rear housing portion, which is a rear half of the housing. The wireless communicator is disposed in the front housing portion. Thus, more space is provided in the rear housing portion for the arrangement of other elements.

In accordance with a twenty-fourth aspect of the invention, in the bicycle operation device according to any one of the twentieth to twenty-third aspects, the housing includes an upper housing portion, which is an upper half of the housing, and a lower housing portion, which is a lower half of the housing. The wireless communicator is disposed in the upper housing portion. Thus, more space is provided in the lower housing portion for the arrangement of other elements.

In accordance with a twenty-fifth aspect of the invention, in the bicycle operation device according to any one of the twentieth to twenty-third aspects, the housing includes an upper housing portion, which is an upper half of the housing, and a lower housing portion, which is a lower half of the housing. The wireless communicator is disposed in the lower housing portion. Thus, more space is provided in the upper housing portion for the arrangement of other elements.

In accordance with a twenty-sixth aspect of the invention, in the bicycle operation device according to the first or second aspect, the operation unit further includes an operation lever. The electric switch includes a first switch and a second switch. The operation lever is configured to operate the first switch in a case in which the operation lever is operated in a first operation direction and operate the second switch in a case in which the operation lever is operated in a second operation direction that differs from the first operation direction. Thus, the configuration of the operation unit is simplified.

In accordance with a twenty-seventh aspect of the invention, in the bicycle operation device according to the first or second aspect, the operation unit further includes an operation member, and the bicycle operation device further includes a reversing structure that allows the operation member to be arranged on one side of the clamp or the other side of the clamp with respect to an axial direction of the clamp that is parallel to a center axis of the handlebar in a state in which the bicycle operation device is mounted to the handlebar. This allows for selection of the position of the first operation member relative to the clamp.

The bicycle operation device allows for easy adjustment of the position of the operation unit relative to the handlebar.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
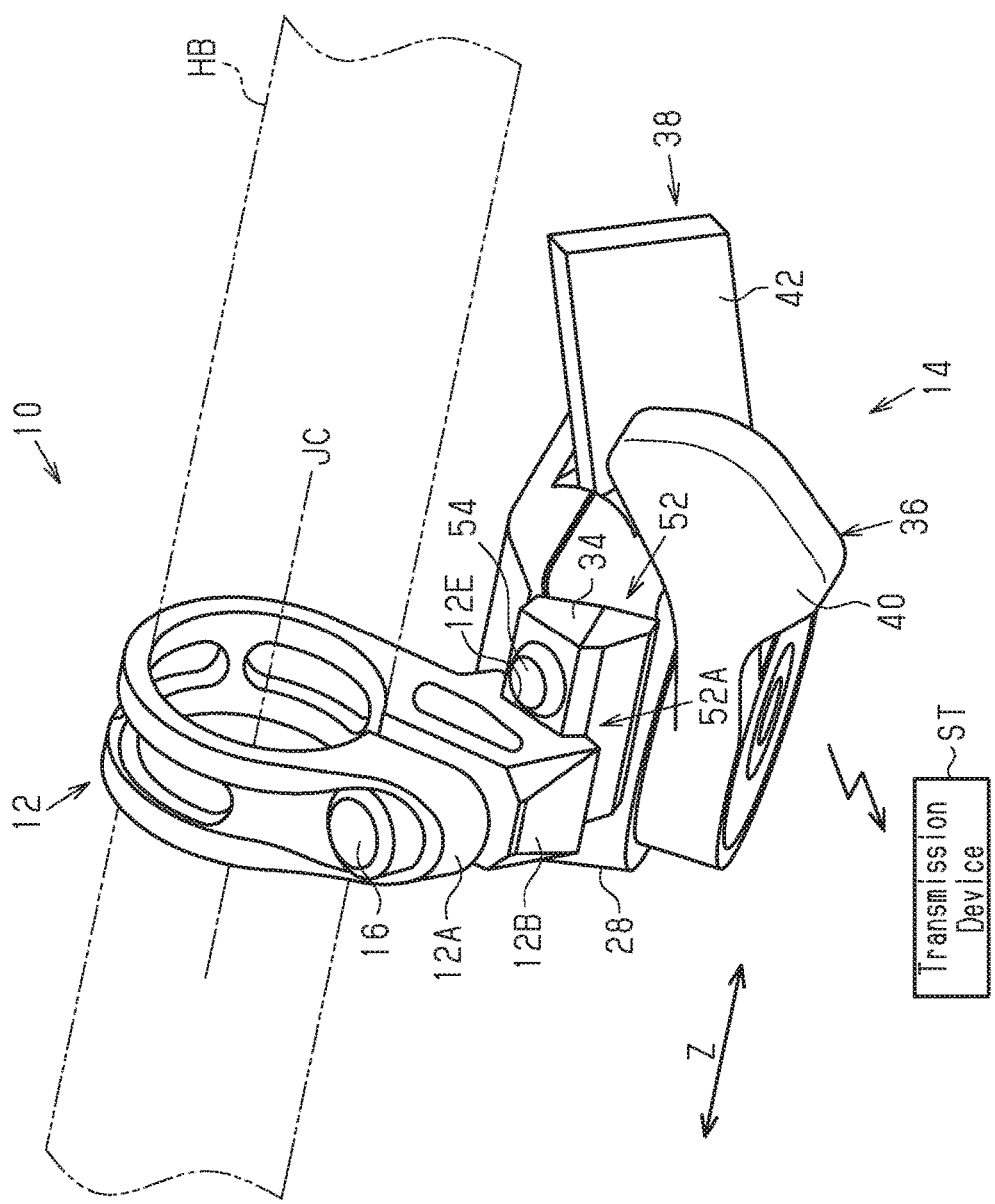
FIG. 1 is a perspective view of a bicycle operation device in accordance with a first embodiment.

Referring to FIG. 1, a bicycle operation device 10 is attached to a handlebar HB of, for example, a mountain bike. The bicycle operation device 10 includes a clamp 12 and an operation unit 14. The clamp 12 is attachable to the handlebar HB of a bicycle. The operation unit 14 is attachable to the clamp 12. In further detail, the operation unit 14 is attachable to the clamp 12 in a manner allowing for removal of the operation unit 14 from the clamp 12 and adjustment of the position of the operation unit 14 relative to the clamp 12. One example of the operation unit 14 is a shifter that operates a transmission device ST. The transmission device ST includes at least one of a front transmission device and a rear transmission device.

Figure 2:
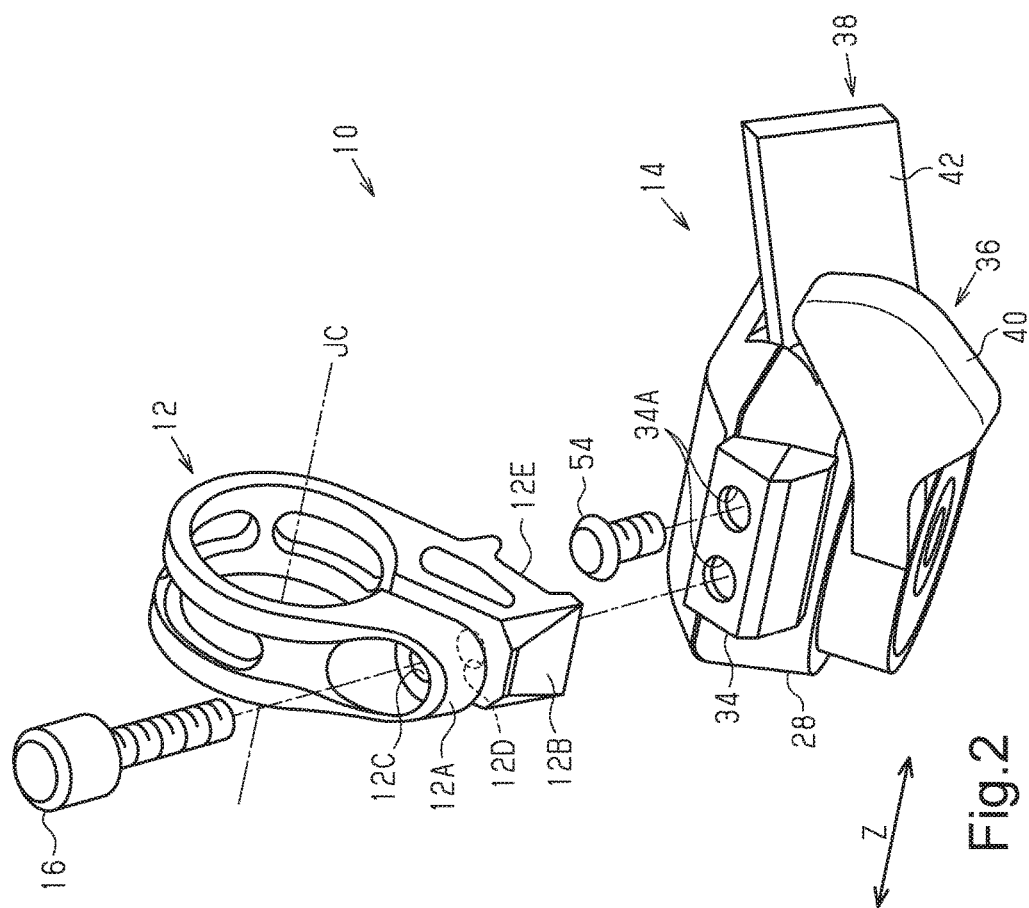
FIG. 2 is an exploded perspective view showing the bicycle operation device of FIG. 1.

As shown in FIG. 2, the bicycle operation device 10 further includes a coupling member 16. The clamp 12 is generally C-shaped in a side elevational view. The clamp 12 includes a first end 12A and a second end 12B. The first end 12A and the second end 12B are opposed to each other. The first end 12A includes a first insertion hole 12C into which the coupling member 16 is insertable. The second end 12B includes a second insertion hole 12D into which the coupling member 16 is insertable. In other words, the first and second insertion holes 12C and 12D each receives the coupling member 16. The coupling member 16 is configured to adjust the distance between the first end 12A and the second end 12B. The operation unit 14 is attachable to the clamp 12 by the coupling member 16. One example of the coupling member 16 is a bolt (i.e., a threaded fastener). The second end 12B includes a recess 12E. The recess 12E extends in an axial direction Z of the clamp 12. The axial direction Z of the clamp 12 is a direction extending along the axis JC of the clamp 12. The recess 12E includes two ends in the axial direction Z that are open in the axial direction Z. The recess 12E includes the second insertion hole 12D.

Figure 3:
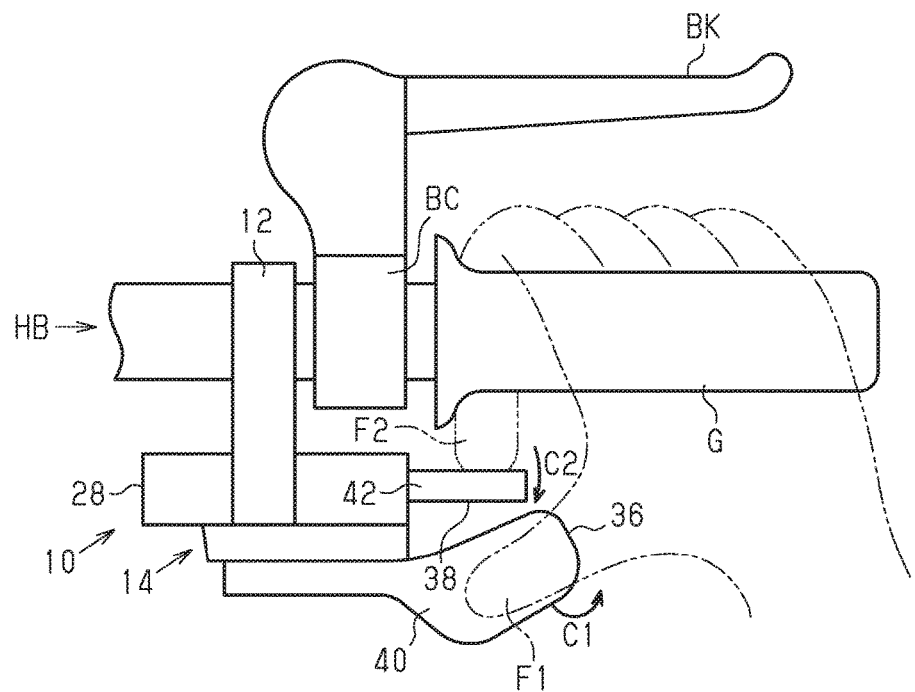
FIG. 3 is a plan view showing the bicycle operation device of FIG. 1 in a state attached to a handlebar.
Figure 4:
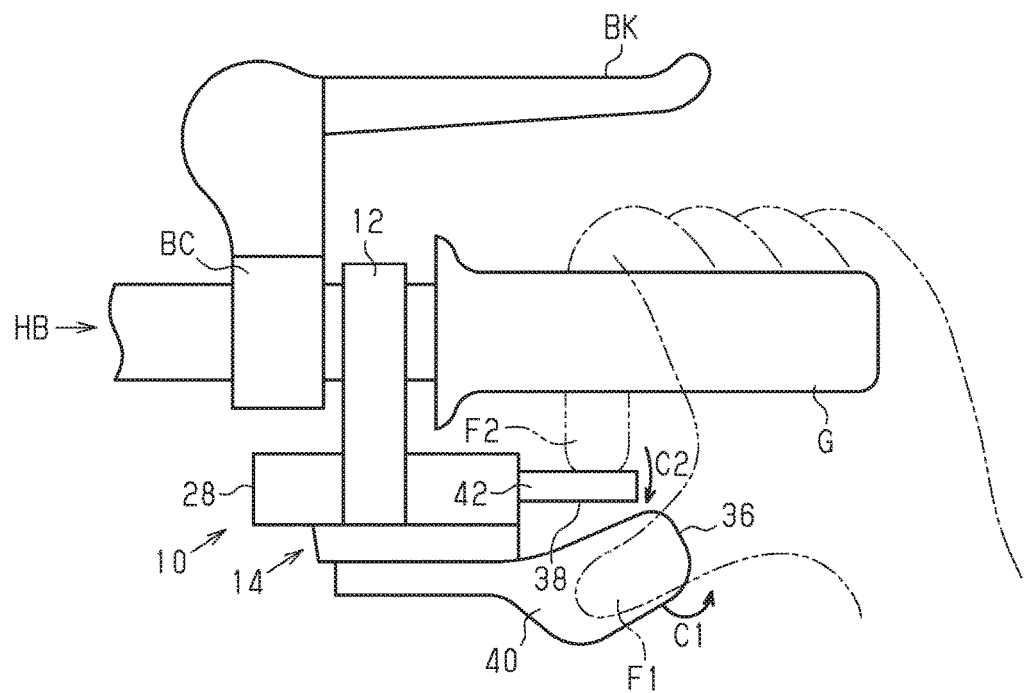
FIG. 4 is a simplified top plan view showing the bicycle operation device of FIG. 1 in a state attached to a handlebar.

As shown in FIGS. 3 and 4, the clamp 12 is separate from a brake clamp BC that attaches a brake operation unit BK of the bicycle to the handlebar HB. The clamp 12 can take, for example, a first attachment state shown in FIG. 3 and a second attachment state shown in FIG. 4. In the first attachment state, the clamp 12 is attached to the handlebar HB closer to a stem (not shown) than the brake clamp BC. In the second attachment state, the clamp 12 is attached to the handlebar HB closer to a grip G than the brake clamp BC.

Figure 5:
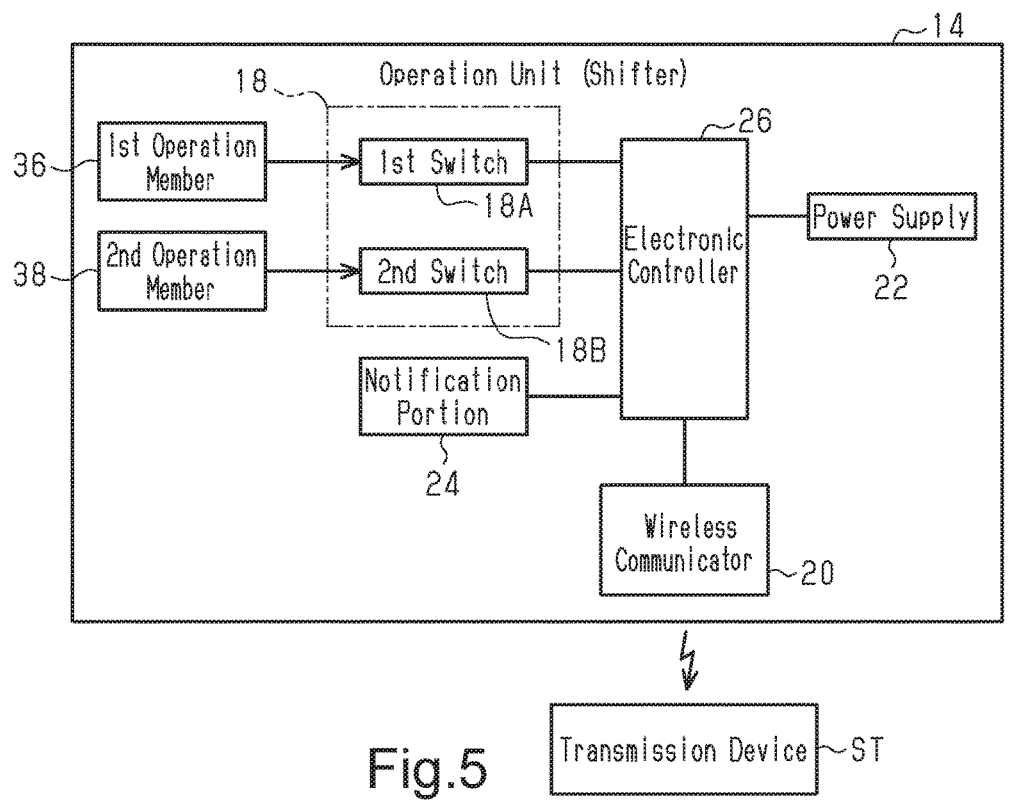
FIG. 5 is a block diagram showing an electrical configuration of an operation unit in the bicycle operation device of FIG. 1.

As shown in FIG. 5, the operation unit 14 includes an electric switch 18. The operation unit 14 further includes a wireless communicator 20, a power supply 22, a notification portion 24 and an electronic controller 26. The electronic controller 26 (hereinafter "the controller 26") includes, for example, a microprocessor. The controller 26 includes one or more processors units and one or more computer memory devices. The controller 26 can also include general circuits such as an input interface circuit and an output interface circuit. The wireless communicator 20 is configured to communicate with the transmission device ST (refer to FIG. 1), which is one example of a bicycle component. The wireless communicator 20 includes an antenna. The term "wireless communicator" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals, ultra-wide band communication signals, or Bluetooth communications or any other type of signal suitable for wireless communications as understood in the bicycle field.

The power supply 22 is connected by electric wires (not shown) to the electric switch 18, the wireless communicator 20, the notification portion 24 and the electronic controller 26. The power supply 22 supplies power via the electronic controller 26 to the wireless communicator 20. The notification portion 24 outputs information. The information includes, for example, information related to the operation unit 14 and/or information input to the bicycle operation device 10 from an external device. The notification portion 24 includes, for example, an LED or a buzzer. In other words, the term "notification portion" refers a physical device that outputs at least one of a haptic notification, a visual notification and an audio notification.

The electric switch 18 is configured to transmit signals to the wireless communicator 20. The electric switch 18 includes a first switch 18A and a second switch 18B. The switches 18A and 18B each output an ON signal to the electronic controller 26. In a case in which the controller 26 receives an ON signal from the switch 18A or 18B, the electronic controller 26 outputs a control signal that corresponds to the received ON signal to the wireless communicator 20. The wireless communicator 20 outputs the received control signal to, for example, the transmission device ST. In a further example, the electric switch 18 directly transmits signals to the wireless communicator 20.

Figure 6:
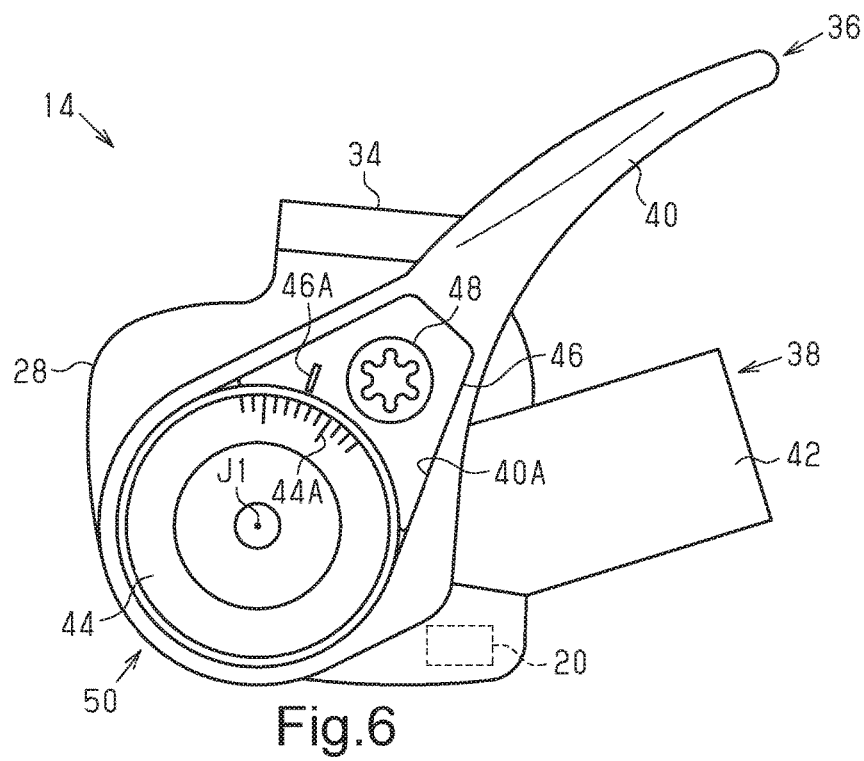
FIG. 6 is a front elevational view of the operation unit showing a second operation member.

As shown in FIG. 6, the operation unit 14 further includes a housing 28. The housing 28 accommodates the wireless communicator 20. The housing 28 further accommodates the electric switch 18, the power supply 22, the notification portion 24 and the electronic controller 26 (all shown in FIG. 4). The wireless signals (e.g., radio waves) output from the wireless communicator 20 are transmitted through the housing 28. The housing 28 includes, for example, resin material that allows the wireless signals to pass therethrough.

The housing 28 includes a rear housing portion 28A, which is the rear half of the housing 28, and a front housing portion 28B, which is the front half of the housing 28. Further, the housing 28 includes an upper housing portion 28C and a lower housing portion 28D. The upper housing portion 28C is the upper half of the housing 28. The lower housing portion 28D is the lower half of the housing 28.

Figure 7:
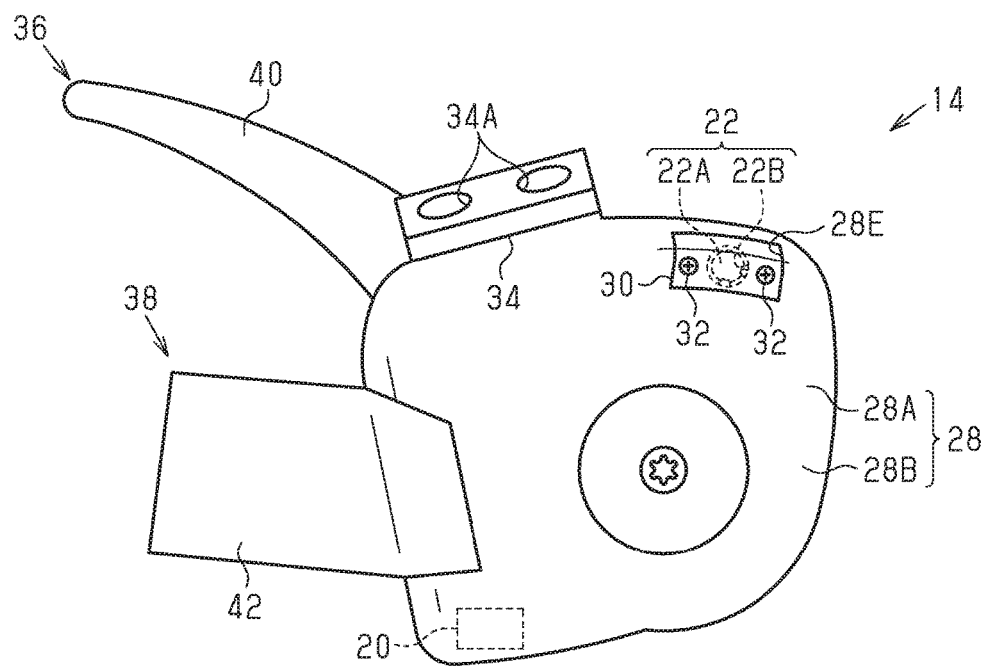
FIG. 7 is a rear elevational view of the operation unit showing the second operation member.
Figure 8:
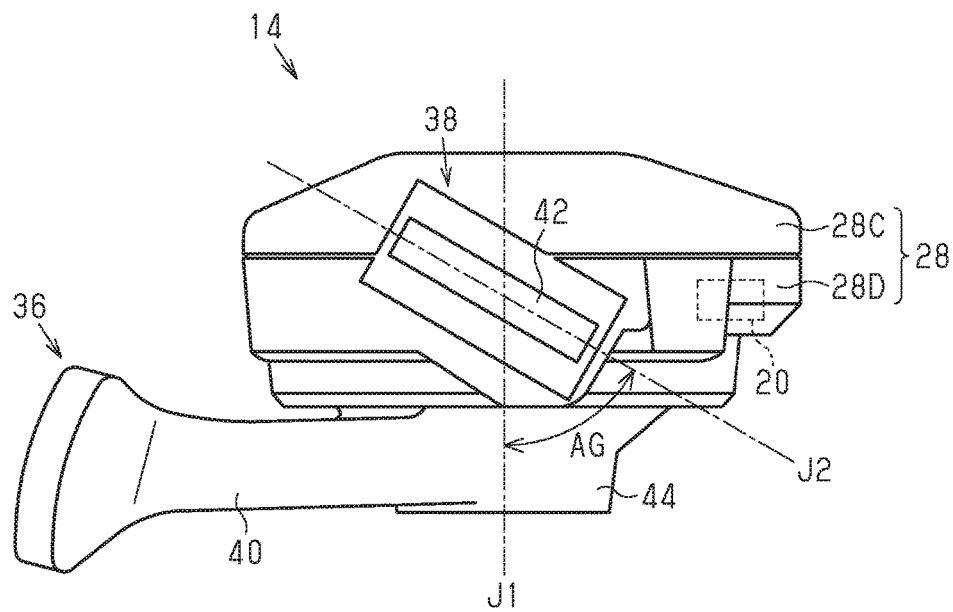
FIG. 8 is a side elevational view of the operation unit showing the second operation member.

As shown in FIG. 7, the wireless communicator 20 is accommodated in the front housing portion 28B. As shown in FIG. 8, the wireless communicator 20 is disposed in the front housing portion 28B and the lower housing portion 28D. The wireless communicator 20 is fixed to the housing 28. In a further example, the wireless communicator 20 is attached in a removable manner to the housing 28.

As shown in FIG. 7, the operation unit 14 includes an accommodation portion 28E and a power supply cover 30. The accommodation portion 28E is configured to at least partially accommodate the power supply 22. The accommodation portion 28E shown in FIG. 7 entirely accommodates the power supply 22. The accommodation portion 28E is arranged in the rear housing portion 28A and the lower housing portion 28D (refer to FIG. 8). The power supply 22 includes a battery 22A and a battery holder 22B. The battery 22A is attached in a removable manner to the battery holder 22B. The power supply cover 30 at least partially covers an opening of the accommodation portion 28E. The power supply cover 30 shown in FIG. 7 entirely covers the accommodation portion 28E. The power supply cover 30 is attached in a removable manner to the housing 28. The power supply cover 30 includes a plurality of bolts 32. The bolts 32 couple the power supply cover 30 to the housing 28.

The operation unit 14 further includes a projection 34. The projection 34 is fixed to the housing 28. In one example, the projection 34 is fixed to the rear housing portion 28A and the lower housing portion 28D. In another example, the projection 34 is attached in a removable manner to the housing 28. The projection 34 and the housing 28 are formed from different materials. One example of the material of the projection 34 is aluminum. The projection 34 includes fastening holes 34A. In one example, the projection 34 includes two fastening holes 34A. The fastening holes 34A each include a threaded wall surface. The coupling member 16 is coupled to one of the fastening holes 34A. In this manner, the operation unit 14 includes the fastening holes 34A, and the coupling member 16 is fastened to one of the fastening holes 34A.

The operation unit 14 includes a first operation member 36, which operates the first switch 18A, and a second operation member 38, which operates the second switch 18B. The first operation member 36 is operated to perform, for example, upshifting. The second operation member 38 is operated to perform, for example, downshifting. The second operation member 38 further includes an elastic member (not shown). The elastic member applies a force to the second operation member 38 that returns the second operation member 38 to its original position. One example of the elastic member is a coil spring.

As shown in FIG. 8, the first operation member 36 includes a first lever 40. The first lever 40 is pivotal about a first axis J1. The first lever 40 is pivoted along a first movement plane that is orthogonal to the first axis J1. The second operation member 38 includes a second lever 42. The second lever 42 is pivotal about a second axis J2. The second lever 42 is pivoted along a second movement plane that is orthogonal to the second axis J2. The angle AG formed by the first movement plane and the second movement plane is 20° or greater and 70° or less. In one example, the angle AG is 60°.

As shown in FIG. 6, the first operation member 36 includes a rotational member 44, two coupling portions 46 and a bolt 48. The first lever 40 includes an accommodation portion 40A. The accommodation portion 40A accommodates the rotational member 44, the two coupling portions 46 and the bolt 48. The first operation member 36 further includes an elastic member (not shown). The elastic member is arranged in the rotational member 44 to apply force to the first operation member 36 that returns the first operation member 36 to its original position. One example of the elastic member is a coil spring.

The axis of the rotational member 44 is aligned with the first axis J1. The rotational member 44 includes calibrations 44A used to adjust the initial position of the first operation member 36. In one example, the calibrations 44A are marked along the outer circumference of the surface of the rotational member 44. The coupling portions 46 are attached to the first lever 40 in a state accommodated in the accommodation portion 40A. The coupling portions 46 include a marking 46A used to adjust the initial position of the first operation member 36. The coupling portions 46 further include an elastic member (not shown). The bolt 48 is inserted into the coupling portions 46 to compress the elastic member, couple a portion of the compressed elastic member to the rotational member 44, and couple the coupling portions 46 to the rotational member 44. In this state, the first lever 40, the coupling portions 46, and the rotational member 44 are integrally rotated about the first axis J1.

The operation unit 14 further includes an operation position adjustment mechanism 50 that is configured to adjust the initial position of at least one of the first operation member 36 and the second operation member 38. The operation position adjustment mechanism 50 includes the first lever 40, the rotational member 44, the two coupling portions 46 and the bolt 48. The operation position adjustment mechanism 50 changes the rotational position of the first lever 40 relative to the rotational member 44 about the first axis J1 to adjust the initial position of the first operation member 36. By loosening the bolt 48 that is inserted into the coupling portions 46, the coupling portions 46 are uncoupled from the rotational member 44. In this state, the first lever 40 and the coupling portions 46 are rotated relative to the rotational member 44 about the first axis J1 to adjust the initial position of the first operation member 36.

Referring to FIGS. 3 and 4, the first operation member 36 is configured to be operated by a first finger F1 of a user. The second operation member 38 is configured to be operated by a second finger F2 of a user. If the first lever 40 is pushed in a first operation direction C1, then the first switch 18A (refer to FIG. 5) goes ON. If the first lever 40 is returned to the initial position, then the first switch 18A goes OFF. If the second lever 42 is pushed in a second operation direction C2, then the second switch 18B (refer to FIG. 5) goes ON. If the second lever 42 is returned to the initial position, then the second switch 18B goes OFF.

As shown in FIG. 1, the bicycle operation device 10 further includes a position adjustment mechanism 52. The position adjustment mechanism 52 is configured to adjust the position of the operation unit 14 in the axial direction Z. The position adjustment mechanism 52 includes a guide structure 52A that guides the operation unit 14 in the axial direction Z. The guide structure 52A includes the recess 12E and the projection 34 that extend in the axial direction Z. The recess 12E is arranged in the clamp 12. The projection 34 is arranged on the operation unit 14. The projection 34 is fitted to the recess 12E and slidable in the axial direction Z. In another example, the recess 12E is arranged in the operation unit 14, and the projection 34 is arranged on the clamp 12.

A bolt 54 is fastened to the one of the two fastening holes 34A where the coupling member 16 is not fastened.

Modified Examples

It should be apparent to those skilled in the art that the present invention may be embodied in many other specific forms without departing from the spirit or scope of the invention. Particularly, it should be understood that the present invention may be embodied in the following forms.

Figure 9:
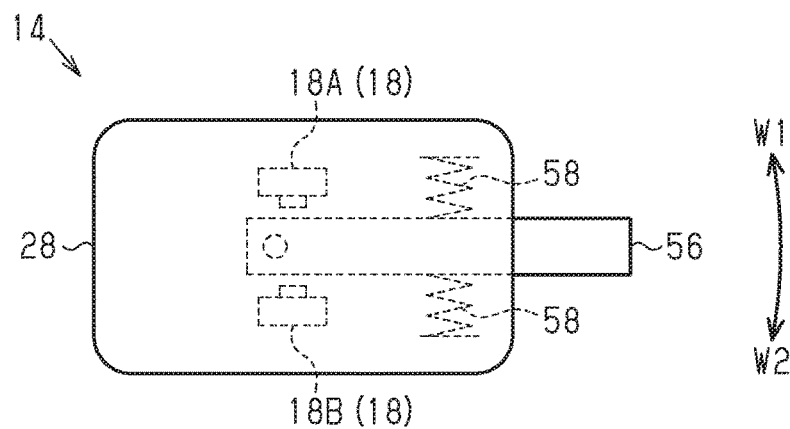
FIG. 9 is a front elevational view of the operation unit showing a first modification.

The configuration of the operation unit 14 may be changed in any manner. For example, as shown by a first modified example of FIG. 9, the operation unit 14 includes an operation lever 56. The operation unit 14 further includes two elastic members 58. The housing 28 includes the switches 18A and 18B. The switches 18A and 18B are located at opposite sides of the operation lever 56. The operation lever 56 is pivotal relative to the housing 28. The two elastic members 58 apply force to the operation lever 56 to return the operation lever 56 to a neutral position. The operation lever 56 is configured to operate the first switch 18A if operated in a first operation direction W1. The operation lever 56 is configured to operate the second switch 18B if operated in a second operation direction W2 that differs from the first operation direction W1.

Figure 10:
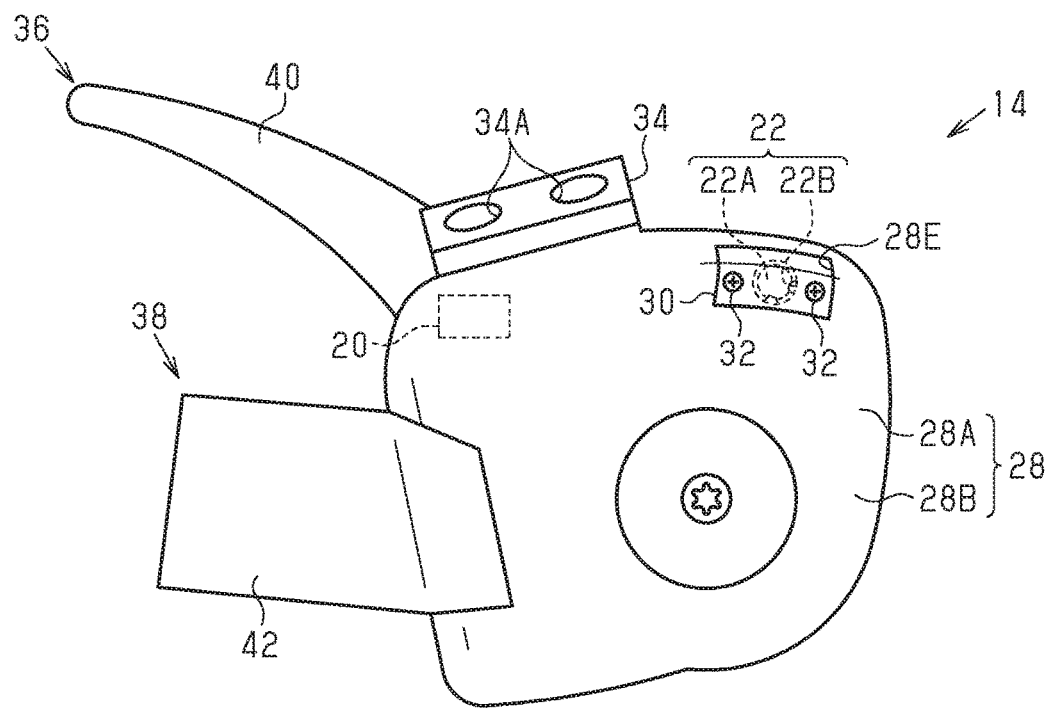
FIG. 10 is a rear elevational view of the operation unit showing a second modification.
Figure 11:
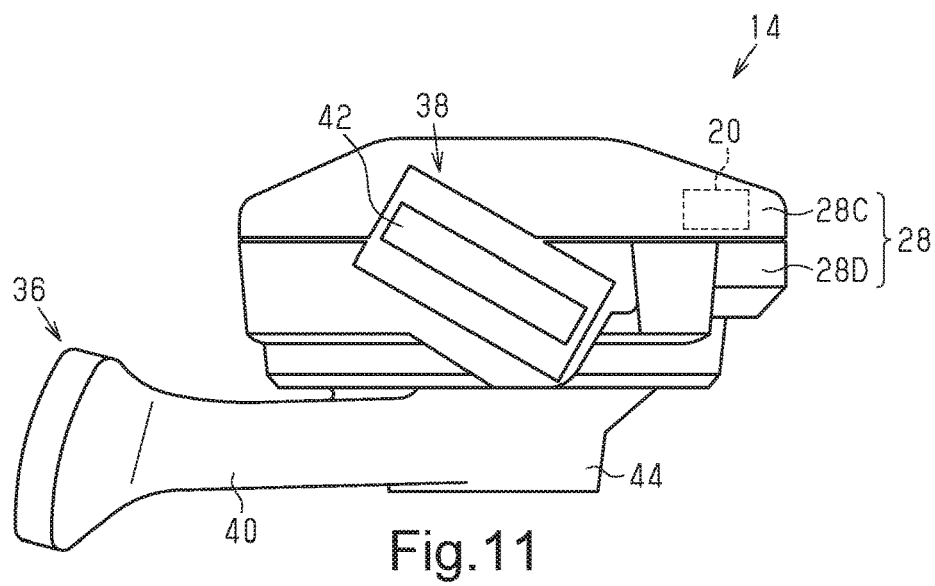
FIG. 11 is a side elevational view of the operation unit showing a third modification.

The location of the wireless communicator 20 in the housing 28 may be changed. In a first example, as shown by a second modified example of FIG. 10, the wireless communicator 20 is accommodated in the rear housing portion 28A of the housing 28. In a second example, as shown by a third modified example of FIG. 11, the wireless communicator 20 is accommodated in the upper housing portion 28C of the housing 28.

Figure 12:
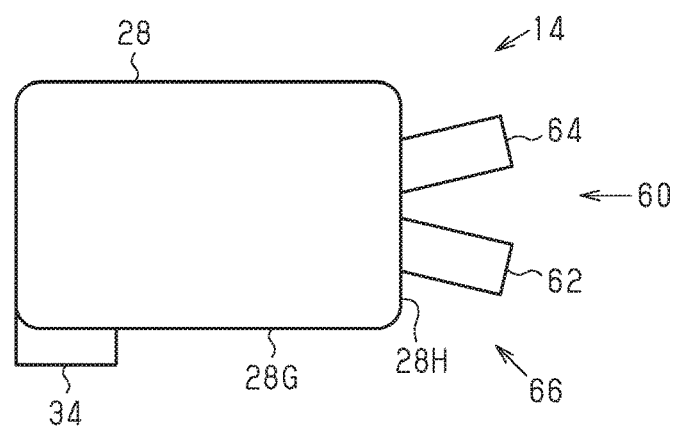
FIG. 12 is a top plan view of the operation unit showing a fourth modification.
Figure 13:
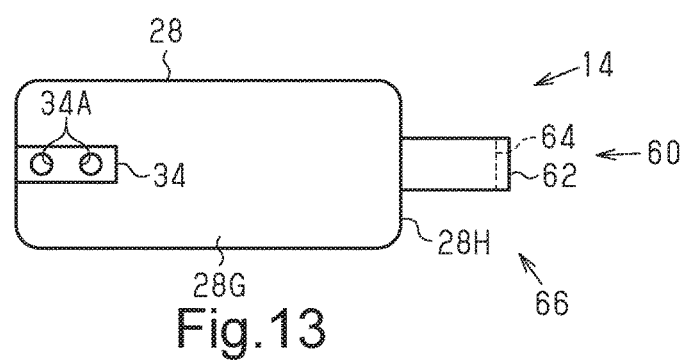
FIG. 13 is a top plan view of the operation unit of FIG. 12.

The configuration of the operation unit 14 can be changed in any manner. For example, as shown by a fourth modified example of FIGS. 12 and 13, the operation unit 14 includes operation members 60. The operation members 60 include a first operation member 62 and a second operation member 64. The operation unit 14 further includes a reversing structure 66 that allows the operation members 60 to be arranged on one side of the clamp 12 or the other side of the clamp 12 with respect to the axial direction Z of the clamp 12. The operation unit 14 can be arranged at a first position or a second position. The first position is located at a right side of a bicycle center plane that extends in a front-rear direction of the bicycle. The second position is located at a left side of the bicycle center plane. At the first position, the clamp 12 is attached to the right side of the handlebar HB. At the second position, the clamp 12 is attached to the left side of the handlebar HB. The reversing structure 66 sets the relationship of the operation unit 14 at the first position and the operation unit 14 at the second position to a plane-symmetric relationship with respect to the bicycle center plane. As shown in FIG. 12, the housing 28 includes a first side surface 28G and a second side surface 28H. The first side surface 28G extends in the longitudinal direction of the handlebar HB at the side facing the clamp 12. The second side surface 28H extends in the height-wise direction of the housing 28 and intersects a direction parallel to the longitudinal direction of the handlebar HB. The operation members 62 and 64 are arranged in the housing 28 to project from the second side surface 28H of the housing 28 at the central portion in the widthwise direction of the housing 28. The projection 34 is arranged on the first side surface 28G at the central portion in the widthwise direction of the housing 28.

Figure 14:
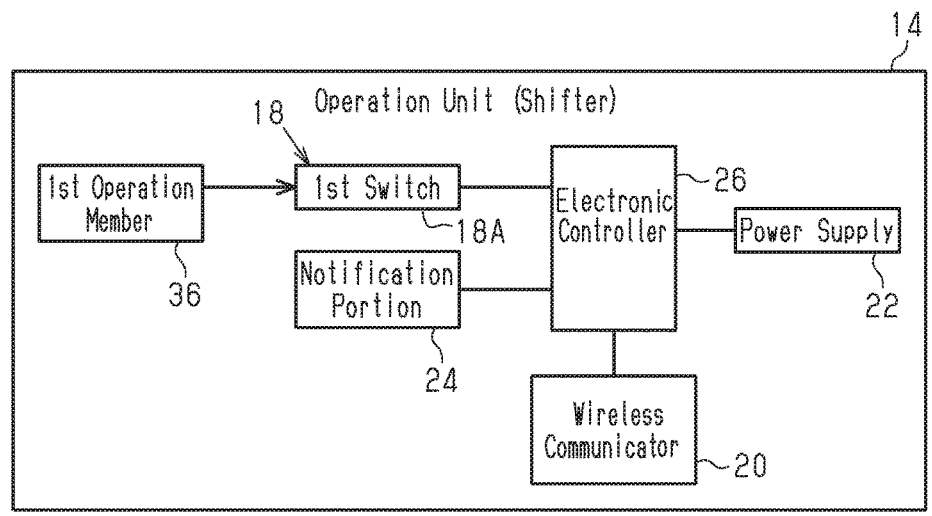
FIG. 14 is a block diagram showing the electrical configuration of a fifth modification.
Figure 15:
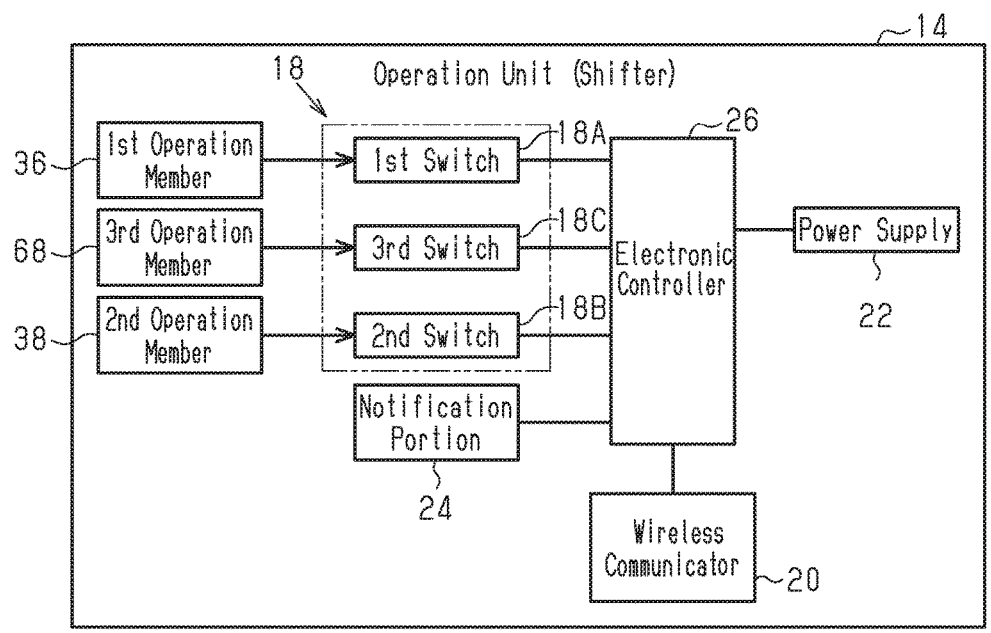
FIG. 15 is a block diagram showing the electrical configuration of a sixth modification.

The quantity of the electric switch 18 in the operation unit 14 may be changed as required. In a first example, as shown by a fifth example of FIG. 14, the electric switch 18 includes only the first switch 18A. In this case, the operation unit 14 further includes the first operation member 36 to operate the first switch 18A. In a second example, as shown by a sixth modified example of FIG. 15, the electric switch 18 includes the first switch 18A, the second switch 18B, and a third switch 18C. In this case, the operation unit 14 further includes a third operation member 68 to operate the third switch 18C. The third operation member 68 is arranged on, for example, the first operation member 36 at a location separated from the operation plane of the first operation member 36. One example of a position separated from the operation plane is a plane located at a rear side of the operation plane of the first lever 40. The third operation member 68 is operated, for example, to pair the bicycle operation device 10 with a bicycle component. In one example, the bicycle operation device 10 attached to the right side of the handlebar HB is configured to be paired with one of the front transmission device and the rear transmission device. The bicycle operation device 10 attached to the left side of the handlebar HB is configured to be paired with the other one of the front transmission device and the rear transmission device.

The bicycle component associated with the operation unit 14 of the bicycle operation device 10 may be changed in any manner. In a first example, the operation unit 14 is operated to switch the operational state of an electric suspension. One of the first operation member 36 and the second operation member 38 is operated to hold the electric suspension in a lock-out state and to cancel the lock-out state of the electric suspension. In a second example, the operation unit 14 is operated to adjust the height of an electric seatpost. One of the first operation member 36 and the second operation member 38 is operated to increase the height of the electric seatpost. The other one of the first operation member 36 and the second operation member 38 is operated to decrease the height of the electric seatpost. In a third example, the operation unit 14 is operated to operate the transmission device ST or the electric suspension and the electric seatpost. In a first specific example of the third example, one of the first operation member 36 and the second operation member 38 is operated to switch the operational state of the electric suspension. The other one of the first operation member 36 and the second operation member 38 is operated to operate the front transmission device. In a second specific example of the third example, one of the first operation member 36 and the second operation member 38 is operated to adjust the height of the electric seatpost. The other one of the first operation member 36 and the second operation member 38 is operated to operate the front transmission device. In a third specific example of the third example, in addition to the first operation member 36 and the second operation member 38, the operation unit 14 includes a further operation member. One example of a further operation member is a third operation member 68 shown in FIG. 15. In one example related to the third specific example, one of the first operation member 36 and the second operation member 38 is operated to perform upshifting of the transmission device ST. The other one of the first operation member 36 and the second operation member 38 is operated to perform downshifting of the transmission device ST. The third operation member 68 is operated to switch the operation state of the electric suspension or adjust the height of the electric seatpost.

The configuration of the housing 28 may be changed in any manner. In one example, the housing 28 includes the upper housing portion 28C and the lower housing portion 28D that are separately formed. A joining means joins the upper housing portion 28C and the lower housing portion 28D to form the housing 28. The housing 28 may have, for example, a first configuration or a second configuration. In the first configuration, the lower housing portion 28D includes the accommodation portion 28E. Instead of the power supply cover 30 shown in FIG. 7, the upper housing portion 28C forms a power supply cover that protects the power supply 22. The power supply cover 30 is omitted. In the second configuration, the upper housing portion 28C includes the accommodation portion 28E. Instead of the power supply cover 30 shown in FIG. 7, the lower housing portion 28D forms a power supply cover that protects the power supply 22. The power supply cover 30 is omitted. The joining means includes, for example, a bolt or a fitting structure. When the joining means includes a bolt, the upper housing portion 28C and the lower housing portion 28D are fastened together by the bolt to form the housing 28. When the joining means includes a fitting structure, a projection arranged on one of the upper housing portion 28C and the lower housing portion 28D is fitted to a recess arranged in the other one of the upper housing portion 28C and the lower housing portion 28D to form the housing 28.

The structure for fastening the operation unit 14 to the clamp 12 can be changed in any manner. In a first example, the operation unit 14 includes the fastening holes 34A that extend through the projection 34. The bicycle operation device 10 further includes a first nut (not shown). The coupling member 16 is inserted into one of the fastening holes 34A. The distal end of the coupling member 16 projects into the housing 28 through the fastening hole 34A. The first nut is fastened to the distal end of the coupling member 16. In a second example, the operation unit 14 includes the coupling member 16. The coupling member 16 is a tube or rod formed integrally with the projection 34 or a tube or rod fixed to the projection 34. The coupling member 16 includes a male thread (not shown). The male thread is formed on the outer circumferential surface of the coupling member 16. The clamp 12 includes a female thread (not shown) mated with the coupling member 16. The female thread is formed on, for example, a wall surface of at least one of insertion holes 12C and 12D. The male thread of the coupling member 16 is mated with the female thread of the clamp 12 to fix the operation unit 14 to the clamp 12. In a third example, the bicycle operation device 10 of the second example further includes a second nut (not shown). The distal end of the coupling member 16 projects through the first insertion hole 12C and out of the clamp 12. The second nut is fastened to the distal end of the coupling member 16.

What is claimed is:

1. A bicycle operation device comprising:
a clamp that is attachable to a handlebar of a bicycle; and
an operation unit including a wireless communicator configured to communicate with a bicycle component and an electric switch configured to transmit a signal to the wireless communicator to indicate an ON state to wirelessly operate the bicycle component, the operation unit being adjustably attached to the clamp in a manner allowing for adjustment of a position of the operation unit relative to the clamp.

2. The bicycle operation device according to claim 1, wherein
the clamp includes a first end and a second end,
the first end includes a first insertion hole that receives a coupling member,
the second end including a second insertion hole that receives the coupling member, and
the operation unit being attached to the clamp by the coupling member.

3. The bicycle operation device according to claim 2, wherein
the operation unit includes a plurality of fastening holes, the coupling member being selectively fastened at the fastening holes to adjust of a position of the operation unit relative to the clamp.

4. The bicycle operation device according to claim 1, wherein
the operation unit further includes a notification portion.

5. The bicycle operation device according to claim 1, further comprising
a position adjustment mechanism configured to adjust a position of the operation unit relative to the clamp in an axial direction of the clamp that is parallel to a center axis of the handlebar in a state in which the bicycle operation device is mounted to the handlebar.

6. The bicycle operation device according to claim 5, wherein
the position adjustment mechanism includes a guide structure that guides the operation unit in the axial direction,
the guide structure includes a recess and a projection that extend in the axial direction,
the recess is arranged in one of the clamp and the operation unit, and
the projection is arranged on the other one of the clamp and the operation unit.

7. The bicycle operation device according to claim 1, wherein
the clamp is separate from a brake clamp that attaches a brake operation unit of the bicycle to the handlebar.

8. The bicycle operation device according to claim 1, wherein
the electric switch includes a first switch and a second switch.

9. The bicycle operation device according to claim 8, wherein
the operation unit further includes a first operation member that operates the first switch and a second operation member that operates the second switch.

10. The bicycle operation device according to claim 9, wherein
the first operation member includes a first lever that is pivotal about a first axis, and
the second operation member includes a second lever that is pivotal about a second axis.

11. The bicycle operation device according to claim 10, wherein
the first lever is pivoted along a first movement plane that is orthogonal to the first axis,
the second lever is pivoted along a second movement plane that is orthogonal to the second axis, and
an angle formed by the first movement plane and the second movement plane is 20° or greater and 70° or less.

12. The bicycle operation device according to claim 9, wherein
the first operation member is configured to be operated by a first finger of a user, and
the second operation member is configured to be operated by a second finger of the user.

13. The bicycle operation device according to claim 10, wherein the operation unit includes an operation position adjustment mechanism that is configured to adjust an initial position of at least one of the first operation member and the second operation member.

14. The bicycle operation device according to claim 1, wherein
the electric switch includes a first switch, a second switch and a third switch.

15. The bicycle operation device according to claim 1, wherein
the electric switch includes only a first switch.

16. The bicycle operation device according to claim 1, wherein
the operation unit further includes a housing that accommodates the wireless communicator and allows the transmission of radio waves output from the wireless communicator.

17. The bicycle operation device according to claim 16, wherein
the housing includes a resin material.

18. The bicycle operation device according to claim 16, wherein
the housing includes a front housing portion, which is a front half of the housing, and a rear housing portion, which is a rear half of the housing; and
the wireless communicator is disposed in the rear housing portion.

19. The bicycle operation device according to claim 16, wherein
the housing includes a front housing portion, which is a front half of the housing, and a rear housing portion, which is a rear half of the housing; and
the wireless communicator is disposed in the front housing portion.

20. The bicycle operation device according to claim 16, wherein
the housing includes an upper housing portion, which is an upper half of the housing, and a lower housing portion, which is a lower half of the housing; and
the wireless communicator is disposed in the upper housing portion.

21. The bicycle operation device according to claim 16, wherein
the housing includes an upper housing portion, which is an upper half of the housing, and a lower housing portion, which is a lower half of the housing; and
the wireless communicator is disposed in the lower housing portion.

22. The bicycle operation device according to claim 1, wherein
the operation unit further includes an operation lever,
the electric switch includes a first switch and a second switch, and
the operation lever is configured to operate the first switch in a case in which the operation lever is operated in a first operation direction and operate the second switch in a case in which the operation lever is operated in a second operation direction that differs from the first operation direction.

23. The bicycle operation device according to claim 1, wherein
the operation unit further includes an operation member, and the bicycle operation device further comprises a reversing structure that allows the operation member to be arranged on one side of the clamp or the other side of the clamp with respect to an axial direction of the clamp that is parallel to a center axis of the handlebar in a state in which the bicycle operation device is mounted to the handlebar.

24. A bicycle operation device comprising:
a coupling member;
a clamp that is attachable to a handlebar of a bicycle; and
an operation unit including a wireless communicator configured to communicate with a bicycle component and an electric switch configured to transmit a signal to the wireless communicator to indicate an ON state to wirelessly operate the bicycle component, the operation unit being attachable to the clamp by the coupling member,
the clamp including a first end and a second end,
the first end including a first insertion hole that receives the coupling member,
the second end including a second insertion hole that receives the coupling member,
the coupling member being configured to adjust a distance between the first end and the second end.

25. A bicycle operation device comprising:
a clamp that is attachable to a handlebar of a bicycle; and
an operation unit including a wireless communicator configured to communicate with a bicycle component and an electric switch configured to transmit a signal to the wireless communicator, the operation unit being adjustably attached to the clamp in a manner allowing for adjustment of a position of the operation unit relative to the clamp, the operation unit further including a power supply that supplies power to the wireless communicator.

26. The bicycle operation device according to claim 25, wherein
the operation unit further includes a housing and a power supply cover, the housing includes an accommodation portion configured to at least partially accommodate the power supply, the power supply cover at least partially covers an opening of the accommodation portion, and the power supply cover is attachable in a removable manner to the housing.

27. The bicycle operation device according to claim 26, wherein
the power supply includes a battery and a battery holder, and
the battery is attached in a removable manner to the battery holder.

* * * * *